United States Patent [19]

Gill

[11] Patent Number: 4,479,356

[45] Date of Patent: Oct. 30, 1984

[54] ELASTOMERIC ENERGY RECOVERY SYSTEM

[75] Inventor: John D. Gill, Annapolis, Md.

[73] Assignee: Elastomer Energy Recovery, Inc., Annapolis, Md.

[21] Appl. No.: 352,081

[22] Filed: Feb. 25, 1982

[51] Int. Cl.$^3$ .............................................. F01B 21/04
[52] U.S. Cl. ...................................... 60/699; 60/668;
 180/165; 185/37; 185/39; 185/43; 267/57.1 A
[58] Field of Search ................... 60/699, 668; 180/165;
 185/37, 39, 40 H, 43; 188/268; 267/57.1 R, 57.1 A, 153

[56] References Cited

U.S. PATENT DOCUMENTS

| | | | |
|---|---|---|---|
| 3,126,070 | 3/1964 | Hayek | 267/153 X |
| 4,236,387 | 12/1980 | Takatsu | 267/57.1 R X |
| 4,246,988 | 1/1981 | Hoppie | 185/40 H X |
| 4,319,655 | 3/1982 | Hoppie | 180/165 |

Primary Examiner—Stephen F. Husar
Attorney, Agent, or Firm—Epstein & Edell

[57] ABSTRACT

An energy recovery system for a machine, and particularly an automotive vehicle, includes an energy storage device which selectively receives energy from the prime mover for storage via a predetermined path and delivers stored energy to the prime mover load via the same path. In the preferred embodiment the energy storage device is an elastomeric tube which is disposed for rotational movement about a shaft and secured at the ends to respective end members. Braking units permit selective braking and releasing of the end members relative to fixed supports. A set of planet gears are controlled by the brake actuation to drive a sun gear or be driven by a ring gear to effect energy inflow and outflow, respectively, from the elastomeric tube. The storage device is permitted to store energy or release its stored energy as a function of vehicle control and operational parameters.

15 Claims, 8 Drawing Figures

ELASTOMERIC ENERGY RECOVERY SYSTEM

TECHNICAL FIELD

The present invention relates to energy recovery systems and devices for use in conjunction with machines which are thereby able to operate at optimum efficiency. Although the preferred embodiments are described in relation to automotive vehicles, it should be understood that the principles of the invention relate to any system in which a prime mover drives a specified part of the system at a variable speed.

BACKGROUND OF THE INVENTION

It has been recognized in the prior art that kinetic energy of a vehicle can be stored as potential energy during braking of the vehicle and then later used to power the vehicle. By utilizing energy that would normally be dissipated as heat in the vehicle brakes, the use of this stored energy reduces the amount of primary energy required to propel the vehicle. For an example of the type of regenerative braking system, reference is made to U.S. Pat. No. 4,246,988 to Hoppie.

It has also been recognized that kinetic energy can be derived from the vehicle during normal vehicle operation, such as during coasting, such energy being likewise stored for subsequent use in reducing power requirements from the engine. An example of this type of system is found in U.S. Pat. No. 3,734,222 to Bardwick. Other patents concerned with this subject matter are U.S. Pat. Nos. 4,098,144 (to Besel et al.) and 4,159,042 (to Jayner).

The systems in the aforementioned Bardwick and Besel et al patents employ one or more inertial flywheels for energy storage and selectively interconnect the vehicle drive shaft to the flywheels in driven or driving relation by means controlled gearing and braking arrangements. The flywheel storage approach has not been received with great success because it requires a relatively complex energy transfer mechanism which is subject to failure and which is relatively inefficient so as to dissipate a considerable proportion of the transferred energy. This has led experimenters to use elastomeric storage devices for storing the energy. The aforementioned Hoppie and Jayner patents disclose such storage devices in the form of solid elastomeric bodies which are either torsionally stressed, as in Hoppie, or longitudinally stressed, as in Jayner. While these elastomeric storage devices appear fine in concept, their deployment brings about many practical problems. Specifically, longitudinal stressing requires bulky, complicated and awkwardly shaped storage devices to permit storage of any meaningful amount of energy. A solid elastomeric device, stressed torsionally, experiences zero stress at the axis and only at the surface can the material be fully stressed. Consequently, energy storage per pound of elastomer is low. Further, a solid elastomeric element must be kept relatively short and wound only a few turns to be kept stable. Thus, an extremely high gear ratio, from engine shaft speed to turns of the storage device, is mandatory.

Apart from the practical problems noted above, the systems described in all of the aforementioned patents require separate energy transmission paths for energy delivery to and transfer from the storage device. The dual paths involve space consumption, high cost, and energy losses.

In U.S. Pat. No. 3,126,070 there is disclosed an energy storage device wherein a rubber tube is bonded at each end to respective cap for a shaft about which the tube is rotatably slidable. The caps are rotatable relative to the shaft but can be individually locked so that the rubber tube can be torsionally stressed or torsionally relaxed. To my knowledge, no one has considered a hollow elastomeric tube for use for vehicle energy recovery. Certainly Hayek did not consider use of the tube with such large loads since Hayek discusses the use of his device for mechanical toys, clocks, and the like. The relatively simple connection of the tube to the end caps, and simple ratchet arrangements to preclude unintended energy release, would, in any case, preclude the use of the Hayek device for any heavy load operation such as vehicle energy recovery. Moreover, since Hayek requires delivery and removal of energy to be achieved at opposite ends of the device, the problem of separate energy flow paths, with the disadvantages noted above, remains.

SUMMARY OF THE INVENTION

It is an object of the present invention to provide an energy recovery system, suitable for use in an automotive vehicle, in which a common energy transmission path can be used to both deliver energy to the storage device and remove energy from the storage device.

It is another object of the present invention to provide an energy recovery system capable of use with high load machines such as automotive vehicles.

It is still another object of the present invention to provide an energy recovery system for motor vehicles which employs a tubular elastomeric storage member that has been adapted for heavy duty use.

I have discovered that a tubular elastomeric energy storage device has more than five times the torsional energy storage capacity per pound of elastomer than a solid elastomeric device having the same outside dimensions. In accordance with the present invention I am able to utilize such a tubular elastomeric storage device in conjunction with a common energy transmission path for both storage and release of energy. The tubular storage device is disposed concentrically about a shaft and secured to the shaft at one end. The remainder of the tube is free to rotate about the shaft so that the tube can be torsionally stressed twisting it about the fixed end. The other end of the tube is secured to a hub which is selectively braked to or released from a fixed reference. A plurality of planet gears are arranged to drive the shaft to which a sun gear is secured when energy is being stored. Alternatively a ring gear is arranged to drive the planet gears during release of energy.

The prime mover rotatably drives a first drive shaft which drives a continuously variable transmission and, through a clutch engagement, is connected to drive or be driven by the energy storage device. Depending upon the demands on the engine, whether or not the vehicle brakes are actuated and the amount of energy stored in the energy storage device, the storage device will idle, receive energy for storage from the engine, or deliver stored energy to transmission.

The resulting energy recovery system permits a smaller, less expensive and more reliable energy recovery device than is possible in prior art system of like storage capacity.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF THE PREFERRED EMBODIMENTS

Figure 1:
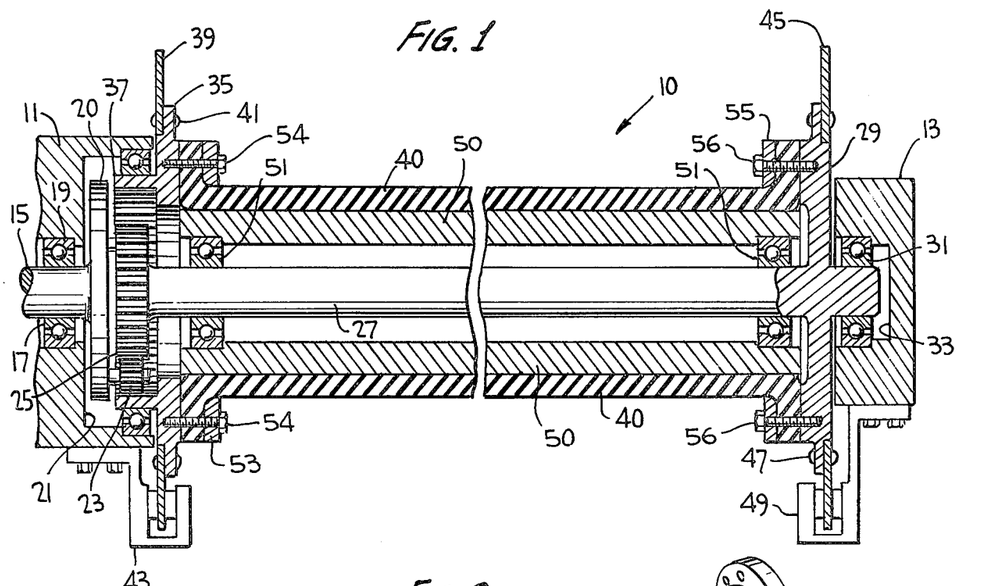
FIG. 1 is a view in horizontal section of an energy storage device of the present invention.

Referring specifically to FIG. 1 of the accompanying drawings, an energy storage device 10 according to the present invention is shown disposed between respective end housing or frame members 11 and 13. Frame members 11 and 13 are axially spaced from one another and are positionally grounded relative to the machine. In this respect, the phrase "positionally grounded" means that frame members 11 and 13 are not movable with respect to the vehicle or other machine in which storage device is used and, therefore, are not movable relative to one another. A torque shaft 15 is provided through which energy to be stored is delivered to storage device 10 and through which stored energy can be returned to the vehicle or machine. The torque shaft 15 extends through a bore 17 in end frame 11 in which the torque shaft is journaled by means of bearing 19. Bore 17 extends from the distal end of frame member 11 to a recess 21 of generally shallow cylindrical configuration defined in the surface of that frame member which faces opposite frame member 13. A planet gear carrier 20 is disposed in recess 21 and constitutes the termination of torque shaft 15 with respect to which the planet carrier is coaxially disposed. A plurality of planet gears 23, positioned at equi-angular spaced locations, project axially from planet gear carrier 20 toward frame member 13. For present purposes it is assumed that three planet gears 23 are provided; however, this should not be construed as being a limiting feature of the invention.

The planet gears 23 cooperatively engage a sun gear 25 formed as one end of an inner shaft member 27. Shaft member 27 projects axially from sun gear 25 toward frame member 13 and includes in a radially enlarged hub 29 disposed immediately adjacent the facing surface of that frame member. Frame member 13 is provided with a recess 33 in which the end of shaft 27 is journaled by means of bearing 31. A hub 35 is also provided at the other end of shaft 27 but is not fixed to the shaft. Rather, hub 35 annularly surrounds and is radially spaced from shaft 27 at a location proximate sun gear 27. Hub 35 includes an annular wall 37 which projects axially to surround a portion of the sun gear in spaced relation to permit the planet gears 23 to reside in the annular space between sun gear 25 and annular wall 37. The interior surface of wall 37 is toothed to cooperate with the planet gears 23 and thereby serves as a ring gear member.

A first disc brake assembly includes an annular disc 39 which projects radially outward from hub 35 and is secured thereto by means of rivets 41 or the like. A disc brake caliper 43 is secured to frame member 11 and is selectively operative in a conventional manner to engage disc 39 and thereby preclude relative rotation between hub 35 and frame member 11. A second disc brake assembly includes an annular disc 45 secured to hub 29 by means of rivets 47 of the like so as to extend radially outward from the hub. A disc brake caliper 49 is secured to frame member 13 and is selectively operative in a conventional manner to engage disc 45 and thereby preclude relative rotation between hub 45 and frame member 13. In view of the fact that hub 29 is part of the same integral structure as shaft 27 and sun gear 25, it is clear that positional locking of hub 29 also results in locking of shaft 27 and sun gear 25. A spacer tube 50, made of Teflon or similar low friction material, concentrically surrounds shaft 27 in spaced relation therefrom. Spacer tube 50 is rotatably supported about shaft 27 by means of suitably spaced bearings 51. An elastomeric tube 40, made of natural rubber or suitably resilient synthetic, is supported concentrically about spacer tube 50 with the inside surface of elastomeric tube 40 abutting the outside surface of the spacer tube 50 in free sliding, low friction contact. One end of elastomeric tube 40 is bent radially outward so as to be secured to hub 35. Specifically, the end of elastomeric tube 40 is bent to form a radially extending flange which is secured to an abutting annular surface of hub 35 by means of support ring 53 and screws 54 which axially compress the tube end against the hub. A similar arrangement is provided at the other end of tube 40 which is bent outward and compressed against hub 29 by supporting ring 55 and screws 56. Elastomeric tube 40 is stretched longitudinally before it is secured to the hubs so as to maximize its torsional stress capacity. That is, the increase tension stress permits the tube 40 to be twisted with a greater number of turns before the tube ripples or buckles than would be the case without such tensional stress.

Figures 2, 3, 4:
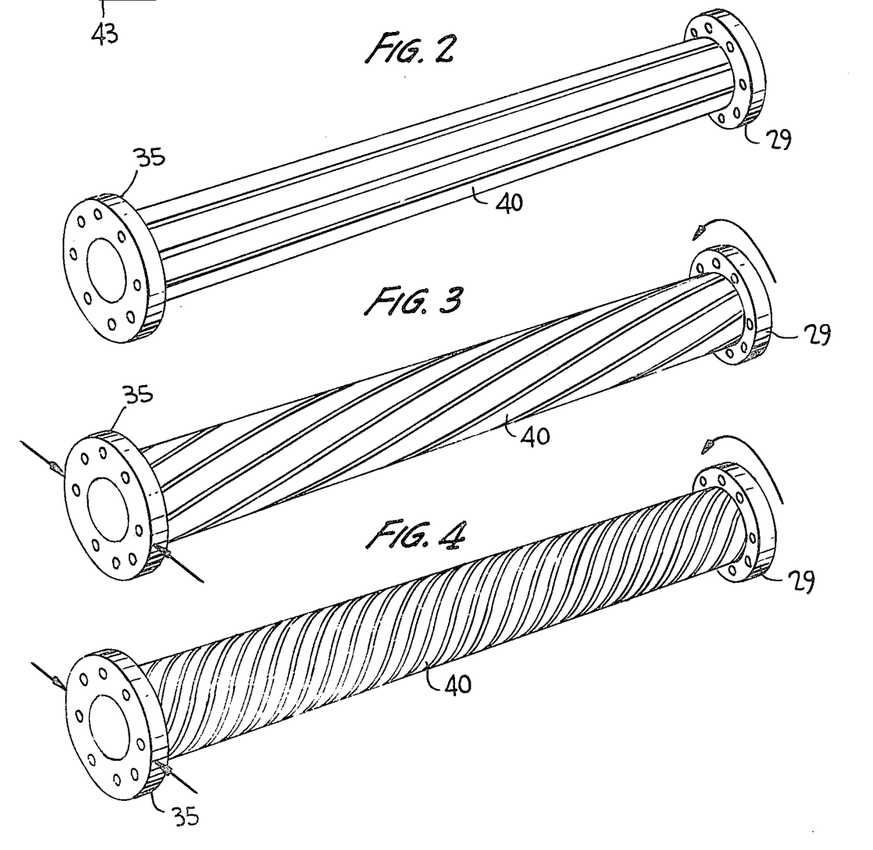
FIG. 2 is a view in perspective of an energy storage device of the same general type as that of FIG. 1 shown unstressed.
FIG. 3 is a view in perspective of the energy storage device of FIG. 2 shown partially stressed.
FIG. 4 is a view in perspective of the energy storage device of FIGS. 2 and 3 shown fully stressed.

Energy is stored in storage device 10 by first actuating the left power brake 39, 43 when torque shaft 15 is rotating. The brake 39, 43 secures hub 35 to frame member 11 and prevents movement of the ring gear 37 relative to the frame. Rotation of the torque shaft 15 rotates the planet carrier 20 so that the planet gears drive sun gear 25, shaft 27 and hub 29 rotatively. Rotation of hub 29 rotates the right hand side of elastomeric tube 40 while the left hand side of that tube remains locked to the frame by the brake 39, 43. As diagrammatically illustrated in FIGS. 2, 3 and 4, the unstressed tube 40 (FIG. 2) begins to twist as it is torsionally stressed by relative rotation between hubs 29 and 35. As hub 29 turns, the number of twists in tube 40 increases as shown in successive stages of increased torsional stress in FIGS. 3 and 4. The low friction spacer tube, which freely floats rotatively about shaft 27, provides stabilizing support for tube 40 while permitting free sliding of tube 40 along the low friction surface of the spacer tube. When the transfer of energy to device 10 for storage is to be terminated, brake 45, 49 is actuated to its lock condition so that it is positionally locked to the frame. With both ends of tube 40 thusly fixed to the frame at respective frame members 11 and 13, the potential energy received in tube 40 in the form of torsional stress remains stored.

When it is desired to retrieve stored energy from tube 40, brake 45, 49 is maintained locked while brake 39, 43 is opened. Under such circumstances the hub 29, shaft 27 and sun gear 25 are maintained fixed with respect to the frame. Hub 35, on the other hand, is free to rotate relative to frame member 11. The torsional stress in tube 40 causes the "free" left end to rotate, causing hub 35 to rotate. The ring gear 37 portion of hub 35 thereby serves as a driver gear which drives the planet gears 23. The planet gears and carrier 20 serve as a follower to rotate torque shaft 15.

When used as an energy storage device in a motor vehicle, the apparatus of FIG. 1 requires that both brake 39, 43 and brake 45, 49 be locked whenever the road wheels are de-clutched from torque shaft 15. Otherwise, the stored energy will merely rotate the idled shaft and be dissipated without performing useful work. Appropriate control signals for controlling the brakes under these and other conditions are provided in accordance with the operation of the overall vehicle or other machine system. An example of such a system is described hereinbelow in relation to FIG. 5.

As discussed previously, the torsional stress capacity of a hollow elastomeric tube is considerably greater than the torsional stress capacity of a solid elastomeric tube, the difference being on the order of five times greater per pound. This is significant when one considers the ratio of road wheel revolutions to storage turns of the elastomeric member. Specifically, for a given gearing ratio between road wheel turns and turns of the elastomeric member, the tubular elastomeric member approach is capable of storing on the order of five times more energy. The actual ratio of turns of the road wheel versus turns of the elastomeric member, when energy is being stored in storage device 10, is determined by the ratios of the diameters of sun gear 25, planet gears 23, and ring gear 37, the design of such diameters being quite within the skill of persons in the field. It is currently contemplated that a ratio of four to one is sufficient for the tubular elastomeric storage device.

The best elastomer for highest energy storage per pound appears to be a natural rubber compound with little or no carbon black content. Such compounds are available with documented storage capacities on the order of 3725 ft-lbs/lb in simple stranded wound rubber motors. Greater storage capacities are believed to be possible. For present purposes, a storage capacity of 2000 ft lbs per pound of rubber is suffient.

The use of the tubular elastomeric storage device, as opposed to a solid elastomeric storage device, has many advantages beyond the increase in storage capacity. For example, all of the rubber in the tubular elastomeric storage device is stressed relatively uniformly. Further, the device is compact in size (relative to storage capacity), thereby lending itself to a variation of lengths, diameters and wall thicknesses to meet required storage capacity, torque limits, optimum turns per given strain and available space requirements. Moreover the device is subject to simple casting in production, can be readily tapered at its end to provide flanges to secure the tube as described, and it produces a smooth torque curve with no "bursts" or discontinuities.

The exact amount of energy which is required to be stored by the elastomeric storage device requires careful analysis of expected driving cycles, type and size of prime movers (engines), vehicle size, etc. All of these factors must be studied to determine the optimum configuration for a vehicle. Preliminary studies indicate that a package capable of storing the energy equivalent of a stop from 55 miles per hour for a given vehicle is a rough equivalent number for the capacity needed to fullfil the required energy saving functions for the system. For example, for a twenty four hundred pound car, it can be shown that the storage capacity for an elastomeric storage device of the type described is roughly 242,700 ft lbs. At a storage capacity four rubber assumed as 4300 ft-lb/lb, the element would weigh 242,700/4300 lbs or 56.5 lbs. For a projected storage capacity of 6450 ft-lbs/lb, the element would weigh 242,700/6450, or 37.5 lbs. These number are approximate and are presented to provide a rough idea for package size. For visualization purposes, one possible configuration for a 56.5 lb element would be a tube which is seventy-two inches long, has an 5.7 inch outside diameter and a two inch inside diameter. The optimum element must be sized to give not only the needed storage capacity, but also to provide the desired torque strain curve and to fit best within a total existing system.

Figure 5:
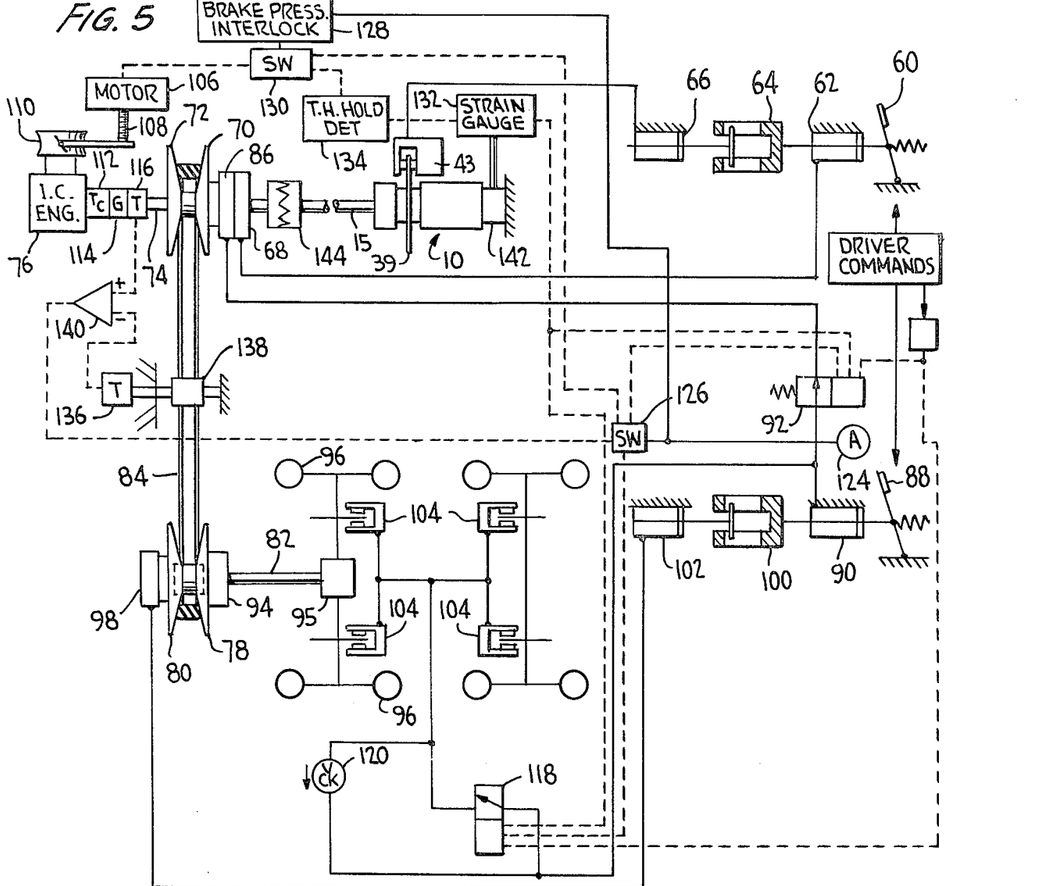
FIG. 5 is a schematic diagram of an energy recovery system employed as part of a motor vehicle and employing the energy storage device of FIG. 1.

Referring specifically to FIG. 5 of the accompanying drawings, a basic control system for a vehicle employing the energy storage device of FIG. 1 is illustrated schematically The system of FIG. 5 may be considered a prime mover load leveling system and regenerative braking system combined. That is, the system is capable of storing energy from the prime mover when a maximum demand is not made on the prime mover; it is also capable of storing energy during braking so as to recapture energy that might be otherwise lost due to heat dissipation. The control elements illustrated in FIG. 5 are only typical examples and should not be construed as the only elements possible for achieving the described functions. Mechanical linkages might in several instances be substituted for hydraulic components; likewise, certain electrical elements can be replaced by well-known hydraulic or mechanical elements. Electrical interconnections are shown with dashed lines in FIG. 5; hydraulic connections are shown with solid lines.

The fundamental concept involved in the system of FIG. 5 is allowing both the prime mover and the retarding or braking system to cause energy to be stored, simultaneously or separately, in the elastomeric storage device. In addition, these same energy sources, namely the prime mover and the energy storage device, can be utilized simultaneously or separately to supply energy to the vehicle propulsion system. As an additional feature, the prime mover energy output can be split between the propulsion demands and storage into the energy storage device. A light road load, a low accelerator demand and low energy level in the storage device are prerequisites for splitting the power output. The technique enhances the ability to smooth out the widely fluctuating energy flows typical of vehicle usage in city traffic, hilly country roads, etc. Thus, a prime mover of minimum size, operating at maximum efficiency, can be utilized.

The system of FIG. 5 relates to a motor vehicle and is described hereinbelow in different sections bearing titles representing general functions of the system as they relate to the operation of the energy storage device.

GENERAL DESCRIPTION

Figure 6:
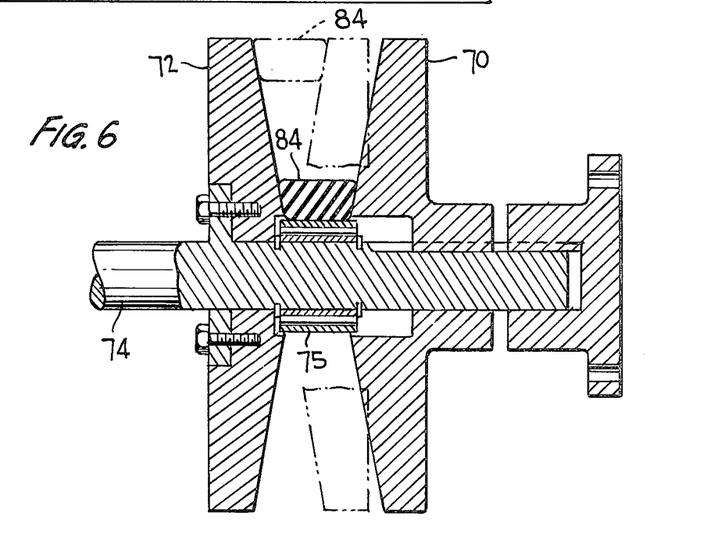
FIG. 6 is a partially diagrammatic view in section of a sheave assembly portion of a continuously variable transmission employed in the system of FIG. 5.

An accelerator pedal 60 is shown linked in driving engagement with an hydraulic cylinder 62 which in turn drives a clevis assembly 64. The clevis assembly 64, in turn, drives a further hydraulic cylinder 66 on a delayed basis so that cylinder 66 is only actuated after accelerator pedal 60 has been depressed by some predetermined amount. An hydraulic output signal from cylinder 66 actuates the caliper 43 for the disc brake assembly 39, 43 at the elastomeric energy storage device 10. An output signal from hydraulic cylinder 62 pressurizes an hydraulic piston 68 which is connected to force an axially movable sheave half 70 toward an axially fixed sheave half 72. Both sheave halves 70, 72 are mounted for rotation on a shaft 74 which is rotatably driven by an internal combustion engine 76. The sheave halves 70, 72, which are illustrated in greater detail in FIG. 6, are part of a conventional continuously variable transmission of a type employed in current model automobiles manufactured by Volvo. Sheave halves 70, 72 operate in conjunction with corresponding movable sheave half 78 and fixed sheave half 80 on drive shaft 82 to support a drive belt 84 between the two sheave assemblies. The mutually facing surfaces of the two sheave halves are generally convex and may be more closely described as frusto-conical. Drive belt 84 has sloped sides so as to permit it to ride along the mutually facing surfaces of the sheave halves 70, 72 as the spacing between the sheave halves changes. For example, in the position illustrated in FIG. 6 by solid lines, the sheave halves 70, 72 are at their most widely spaced position and belt 84 is at its closest position relative to shaft 74. The dotted line representation in FIG. 6 shows the sheaves in their closest relative spacing and belt 84 is seen in its position most removed from shaft 74. As the sheave assembly 70, 72 increases in rotational speed, centrifugal weights incorporated in sheave half 70 assist in causing the sheaves to move closer together. The transmission ratio of the two-sheave continuously variable transmission is thereby adjusted by appropriately spacing the two sheave halves. Hydraulic piston 68 is capable of translating sheave half 70 axially in response to actuation of hydraulic cylinder 62 by the accelerator 60. Likewise, a similar hydraulic piston 86 is responsive to actuation of the brake pedal 88 for achieving axial translation of sheave half 70. With respect to hydraulic piston 86, the actuation signal from the brake pedal 88 is effected through hydraulic cylinder 90 and solenoid 92.

A torque sensing hub 94 stays secured to the drive shaft 82 which drives the differential 95 of the vehicle to drive the driven road wheels 96. Torque sensing hub 94 is positioned adjacent the fixed sheave half 78 of the driven sheave in the continuously variable transmission. A torque sheave actuator sheave actuator piston 98 is disposed adjacent the movable sheave half 80 so as to effect controlled movement of that sheave half in response to actuation of the brake pedal by a predetermined amount through hydraulic piston 90, clevis assembly 100 and further hydraulic piston 102. The hydraulic brake signal derived from hydraulic cylinder 90 is, under certain conditions described below, also employed to actuate the brakes 104 of the vehicle in a conventional manner.

The internal combustion engine 76, also referred to herein as the prime mover, is controlled by a throttle actuator of a conventional type. In the particular example illustrated in FIG. 5, the throttle actuator takes the form of an electric motor 106 which drives a jack screw assembly 108 to control the carburetor 110. Motor 106 is electrically driven in accordance with the electrical circuitry described hereinbelow. A torque converter 112 is provided at the output shaft of engine 76 and feeds a three-position gearbox 114 which has forward, neutral and reverse positions. A tachometer 116 monitors the rotational speed of driven shaft 74. The hydraulic output signal from hydraulic cylinder 90 drives the system brakes 104 in a conventional manner through solenoid 118, the brakes including a bleedback circuit comprising check valve 120. A brake pressure accumulator 124 senses the hydraulic signal at the output of hydraulic cylinder 90 and controls operation of a pressure sensor switch 126 and a brake pressure interlock 128 as part of the means for adjusting the response characteristics of the overall braking or retarding system. The brake pressure interlock 128, in turn, controls a switch 130 in the throttle control circuit.

A strain gauge 132 measures the torque produced by the stored torsional energy in the energy storage device 10 and provides a control signal to operate the motor 106 at the engine throttle via a threshold detector 134 and switch 130. Strain gauge 132 also provides an output signal which controls the by-pass solenoid valve 118 and solenoid valve 92.

A roller 138 is provided to be rotatably driven by transmission drive belt 84 to serve as a means for measuring the speed of the drive belt. A tachometer 136 senses the speed of roller 138, and hence the speed of the belt 84, and provides a speed-indicative signal to one input of a differential operational amplifier 140. The other input of the operational amplifier is derived from tachometer 116 which senses the rotation speed of the drive shaft of engine 76. This differential operational amplifier provides an output signal which powers the circuit of the pressure switch 126.

GENERAL ACCELERATION OPERATION

When the accelerator pedal 60 is depressed to a predetermined depth, the hydraulic signal from delayed hydraulic cylinder 66 actuates the caliper 43 of the disc brake assembly for the energy recovery device 10. In addition, the output signal from hydraulic cylinder 62 pressurizes the hydraulic piston 68 to force axially movable sheave half 70 toward the axially fixed sheave half 72. Progressively increasing the accelerator pedal depression causes an increase in the belt radius at the power sheave 70, 72, thereby increasing the speed of the torque sheave assembly 78, 80 so that the speed of the drive shaft 82 is increased. Total travel of the movable sheave half 70 is limited by the stroke length of hydraulic piston 68. As the drive sheave assembly 70, 72 increases in speed, centrifugal weights incorporated in movable sheave 70 assist in closing the sheave further. Simultaneously, the torque sensing hub 94 of the torque sheave 78 attempts to adjust the radius of belt 84 appropriate to the prevailing driving torque at drive shaft 82. The final positions of the power sheave assembly 70, 72, and torque sheave assembly 78, 80 determine the overall gear ratio of the belt type continuously variable ratio transmission. It will be noted that the accelerator is not directly connected to the prime mover (i.e. engine 76) controls.

GENERAL OPERATION OF PRIME MOVER

By way of example only, the prime mover is illustrated as a spark ignition, throttle controlled internal combustion engine. The basic signal for controlling engine 76 begins at strain gauge 132 which is attached to a one-way sprag clutch 142 at the end of energy storage device 10 remote from shaft 15. Strain gauge 132 measures the torque level stored in the energy storage device and provides a torque signal proportional to the measured torque. This torque signal is employed to control motor 106. Engine 76 supplies power to the energy recovery device 10 via torque converter 112, three-position gearbox 114, shaft 74, clutch 144, and shaft 15.

As long as the power sheave 70, 72 is in the open or idle position, and belt 84 rides on the center spool 75 of the sheave, the prime mover can add energy to energy storage device 10 with neither the accelerator pedal 60 nor the brake pedal 88 actuated. All that is required is a low output signal from strain gauge 132. Whenever the power sheave 70, 72 is closed and belt 84 is on the sheaves rather than the center spool 75 the prime mover can simultaneously supply power to the wheels 96 via belt 84 and to the energy storage device 10 via shaft 74 and shaft 15.

Movable power sheave half 70 is axially moved by either the accelerator-actuated hydraulic piston 68 or the braking-actuated hydraulic piston 86. Both hydraulic pistons are connected in series with open centers for passage of shaft 74 therethrough. Acceleration actuator 68 has sufficient axial stroke to move belt 84 from the center or idle position all the way out to the maximum radius provided by the sheaves in the fully closed position. The braking or retarding actuator 86 has a much more limited stroke; its purpose is to move the belt 84 from the idle position only a short distance onto the sheave radius.

RETARDING IN GENERAL

The brake pedal 88, when actuated, provides a hydraulic signal via cylinder 90, to the retarding actuator 86 so as to move belt 84 into engagement with the power sheave assembly 70, 72. Further depression of the brake pedal 88 causes hydraulic cylinder 102 to provide an hydraulic pressure signal to the torque sheave actuator 98. This actuator produces axial movement of the movable sheave half 80, thereby forcing belt 84 radially outward so as to increase the effective belt radius. This causes the retarding torque in drive shaft 82 to be roughly proportional to the force exerted by the brake pedal 88. For a given braking force, the net belt position (i.e. the retarding gear ratio) depends upon the designed size and adjustment of cylinder 90, accumulator 124 and retarding actuator 86, for the power sheave and cylinder 102 and actuator 98 for the torque sheave. It should be noted that the charge pressure in accumulator 124 is one parameter which can be used to adjust the response characteristic of the overall retarding system.

Delayed actuation of cylinder 102 is accomplished by free play in clevis assembly 100. Therefore, the retarding actuator 86 engages the belt 84 with power sheave halves 70, 72 before the torque sheave actuator 98 begins further adjustment of the belt position.

MAXIMUM ACCELERATION DEMAND WITH LOW STORED ENERGY LEVEL.

If the level in storage device 10 is low, the signal from the torque sensing strain gauge 132 provides a throttle signal to the throttle control motor 106. Engine 76, at this time, is in the process of supplying energy for storage device 10. As the accelerator pedal 60 is depressed, cylinder 62 causes the power sheave actuator 68 to engage the belt and tends to force the belt to increasingly larger radii because of the axial movement of the movable sheave half 70. As belt 84 is engaged, further movement of accelerator pedal 60 actuates cylinder 66 to thereby open the power brake 39, 43 at the energy storage device 10. Under these conditions, all of the engine output is diverted from charging storage device 10 to powering the drive wheels 96 via power sheave 70,72, belt 84, torque sheave 78, 80 and drive shaft 82. No matter how low the level of stored torque is at storage device 10, that torque is also available, through the open brake 39,43 to drive the power sheave 70,72 and help engine 76 power the vehicle. As the demand for power continues until the torque in storage device 10 falls to zero, the open power brake 39,43 and the sprag clutch 142 assure that the storage device 10 idles or "free wheels" without drawing any power from engine 76.

When the accelerator pedal 60 is moved to a lesser demand position, cylinder 66 returns to its zero position and permits the power brake 39, 43 to close. Under these conditions the engine begins to perform a dual task of supplying mild acceleration, or steady state power, while simultaneously charging the energy storage device 10.

MAXIMUM ACCELERATION WITH MAXIMUM STORED ENERGY LEVEL.

Full depression of accelerator pedal 60 opens the power brake 39,43 as described above and attempts, via power sheave actuator 68, to move belt 84 to its maximum sheave radius. In actuality this is a maximum speed situation rather than a maximum torque condition. Torque resistance from shaft 82 causes the torque sensing sheave 78 to close and force the belt to a maximum radius on the torque sheave assembly 78,80. This corresponds to the maximum torque output position. The forced balance between power actuator 68 and the torque sensing sheave 78 produces a resulting comprise belt/gearing ratio to achieve optimum acceleration. Due to the high torque measured by strain gauge 132, there is no initial signal to the engine throttle actuator motor 106. As the torque in the energy storage device 10 decreases due to energy supplied to the vehicle, a low output from strain gauge 132 triggers the threshold detector 134. The engine throttle motor 106 begins to open the throttle at carburetor 110 to maintain the torque output commensurate to the operator command as initiated at the accelerator pedal 60.

One purpose of the elastomeric energy recovery system described herein is to permit efficient use of smaller engines. Therefore, energy storage device 10 must be sized so that the maximum output of device 10 alone can exceed the maximum output of the engine 76 alone. As the torque falls in the energy storage device 10, the supplement provided by engine 76 permits maintenance of a constant and high accelerating capability for the vehicle.

MAXIMUM BRAKING WITH MINIMUM STORED ENERGY LEVEL.

If there is a low level of stored energy in storge device 10 (i.e., low torque and therefore a low output signal level from strain gauge 132), engine 76, through torque converter 112 and gear box 114, turns the power sheave assembly 70, 72 at a high speed while delivering energy to the storage device 10. If the vehicle is moving slowly, the speed of the idler or center spool 75 may be less than the speed of the facing surfaces of the sheave halves 70, 72; therefore, depressing the brake pedal 88 could conveivably cause the power sheave actuator 86 to move the slow moving belt 84 outward onto the relatively fast moving sheaves 70, 72, thereby accelerating the vehicle rather than retarding it as required by the driver command. To prevent this unacceptable situation, there is provided a speed comparator subsystem. This subsystem includes roller 138 which rides on belt 84 so as to be rotatably driven by the belt. Tachometer 136 senses the speed of roller 138 so that the output signal from tachometer 136 is a measure of the belt speed. In addition, the output signal from tachometer 116 which represents the engine speed, is supplied along with the output signal from tachometer 136 to the differential amplifier 140. The speed of the engine shaft, as measured at tachometer 116, represents the linear speed of the interfaces of the sheave halves 70, 72. Differential amplifier 140 provides an output signal whenever the input signal from tachometer 116 exceeds the input signal from tachometer 136. This output signal is blocked by pressure switch 126 whenever the brake pedal 88 is not depressed to produce an output signal from cylinder 90. When the brake pedal is actuated, pressure switch 126 closes so that the output signal from differential amplifier 140 can be applied through the switch to the brake solenoid 118. The brake solenoid 118 is actuated thereby so that pressure from cylinder 90 can be applied to the vehicle brakes 104. Simultaneously, solenoid 92 is closed by the differential amplifier signal passing through switch 126 so as to prevent actuation of power sheave half 70 by actuator 68.

Since one of the two objects of the overall system is to brake or retard the vehicle regeneratively, all of the procedure described above for activating the brakes without engaging the power sheave with the belt are opposite to the design object of accomplishing as much vehicle braking as possible in a regenerative way by storing energy in the storage device 10. To achieve the object, namely storing energy during braking upon a brake command, the speed of the engine output shaft 74 must be reduced whenever necessary to permit earliest engagement of belt 84 to the power sheave assembly 78, 80 so that the energy storage device may be torsionally stressed. With pressure switch 126 actuated and an output signal provided by operational amplifier 140, switch 130 is opened to cause the throttle actuator motor 106 to close down the engine throttle and reduce the rotational speed of shaft 74. As soon as the output signal from tachometer 136 equals the output signal from tachometer 116, the output signal from operational amplifier 140 goes to zero and opens solenoid valve 92. This applies brake pressure to power sheave actuator 86. In addition, the output signal change from operational amplifier 140 causes solenoid valve 118 to close and prevent further buildup of pressure in the wheel brakes 104. Whenever, during a braking operation, the speed ratio sensed at operational amplifier 140 determines that the belt 84 should engage the power sheave assembly 70, 72, the engine 76 should remain in an idle condition. Therefore, switch 130, once opened, is maintained open by a brake pressure interlock 128 so that the switch is prevented from closing until the brake system pressure has been reduced to a low value, or zero, signifying a termination of a specific braking operation.

MINIMUM BRAKING WITH MAXIMUM ENERGY STORED

It is possible for a situation to occur wherein the energy storage device 10 is fully charged and cannot be used for further regenerative braking or retarding. To prevent inadvertent damage to the storage device 10 or dangerous wheel slippage, a high signal from strain gauge 132 opens solenoid valve 118 and closes solenoid valve 92. With solenoid valve 92 closed, the brake actuator cylinder 90 is incapable of moving power sheave actuator 86 to raise the belt 84 from its idle position. Torque sheave actuator 98 is unable to force the belt to a larger radius under these conditions. However, a spring in actuator 98 permits movement of the piston in that actuator to permit movement of cylinder 102 attached to the brake pedal 88.

The system described in relation to FIG. 5 utilizes a common energy transmission path for delivering energy to the storage device 10 for storage and for releasing energy from the storage device 10 for use in the system. Specifically, energy is stored in the storage device 10 my means of shaft 74 operating through clutch 144, to drive shaft 15. Likewise, energy is delivered to the system from the storage device 10 via shaft 15, clutch 144 and shaft 74 to the continuously variable transmission power sheave 70, 72.

The improved energy storage device of FIG. 1 is also useful in a system of the type wherein energy is delivered from the prime mover at one end and released to the drive wheels at the other end of the storage device. Such a system is illustrated in the functional block diagram of FIG. 7. Specifically, driver-initiated inputs are applied to the accelerator pedal 152 and brake pedal 154 on a selective basis. The accelerator pedal controls the prime mover 156 as well as the continuously variable transmission 158 connected between the energy storage device 10 and the differential box 160 which drives the drive wheels 162. A further continuously variable transmission 164 is connected between the prime mover and the input side of the elastomeric energy storage device 10.

Figure 7:
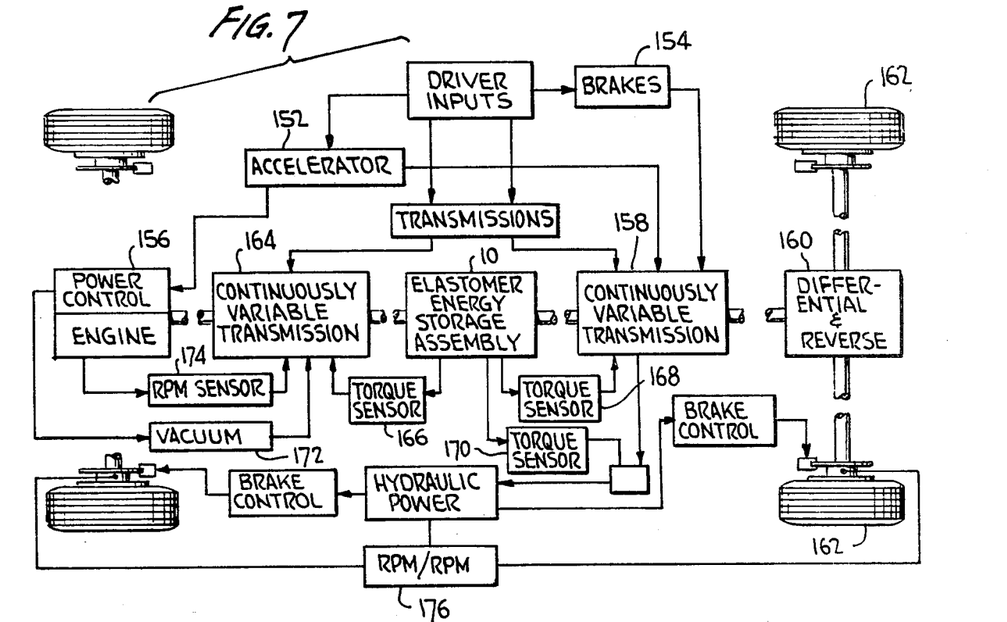
FIG. 7 is a functional block diagram of another energy recovery system of the present invention and employing the energy recovery device of FIG. 1.

The driver inputs for operation of this system differ very little from those used with a conventional automobile equipped with an automatic transmission. In order to cause the vehicle to go faster, the driver depresses the accelerator; in order to slow down the vehicle the driver depresses the brake pedal. Transmission range settings for both the continuously variable transmission 164 and the continuously variable transmission 158 can be set with a single control, although independent controls can be employed. The accelerator signal has two functions, namely: to set the continuously variable transmission 158 to produce torque and engine speed as desired at the drive wheels 162; and to precondition the engine for an immediate energy demand from the energy storage device 10.

Steady state signals controlling engine startup in valve torque 166, 168, 170, vacuum 172 and rpm 174 exchanges. Vigorous depression of the accelerator pedal results in a large rate of energy drain from the energy storage device 10. Therefore, it is desirable that the engine senses this demand and provide full power sooner than would be the case if the only signal fed to the power control is a sensed torque level signal from the energy storage device. The driver can further refine his accelerator response by setting the continuously variable transmission 158 from "cruise" mode to "accelerate" mode.

It is seen that the energy from the prime mover in this system is delivered through the energy storage device 10 which aides the prime mover by supplying its stored energy in addition thereto. It is possible, however, that a situation can occur where the driver applies the brakes and the energy storage device is already charged to its capacity. Under such circumstances, the summed signals of torque and brake activate the hydraulic power brake assembly and irreversible braking occurs via conventional discs or drums. In the interest of safety, the driver is not required to discriminate between the two modes of braking, namely reversible and irreversible. The driver depresses the pedal and, if his demand cannot be met by the stored energy system, the irreversible system takes over. If the reversible retarding operation is limited to rear wheels only, as illustrated, certain situations of panic stop on slipery surfaces will cause the rear wheels to slip excessively. The rpm/rpm converter 176, under these circumstances, activates the hydraulic power brake source to bring into action the forward irreversible friction brakes. Rear braking may continue to occur via the energy storage device 10.

The two continuously variable transmissions 158 and 164 are rather conventional devices. Both transmissions may be the continuously variable transmission described in relation to FIG. 5 and employing the power sheave 70, 72, the torque sheave 78, 80 and the associated drive belt 84. Variable displacement hydraulic drives and/or torque converter compounds may also be employed.

Figure 8:
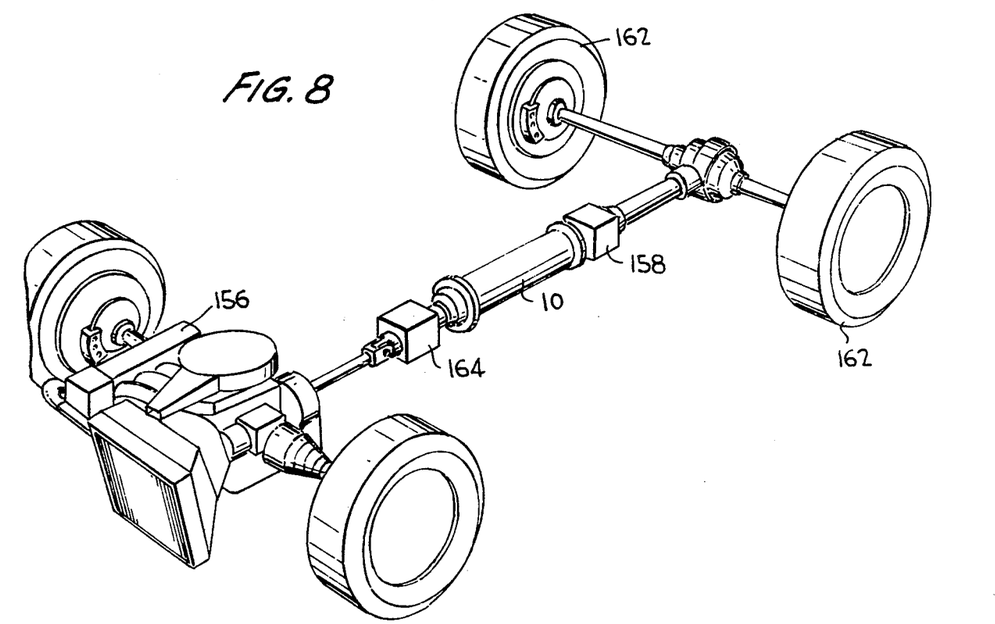
FIG. 8 is a view in perspective of a motor vehicle frame showing deployment of the energy storage device of FIG. 1 as used in the system of FIG. 7.

A typical physical layout of the parts employed for the system of FIG. 7 is illustrated in FIG. 8. Specifically, the engine 156 is disposed forward of the front wheel axle. The drive shaft is shown connected through the continuously variable transmission 164, energy storage device 10, continuously variable transmission 158 and differential box 160, in series. The drive wheels 162 are shown driven by the differential. The two continuously variable transmission boxes 158 and 164, and the energy storage device 10, taken together, consume relatively little space while permitting more efficient use of the prime mover.

While I have described and illustrated specific embodiments of my invention, it will be clear that variations of the details of construction which are specifically illustrated and described may be resorted to without departing from the true spirit and scope of the invention as defined in the appended claims.

What is claimed is:

1. An energy recovery system for use in a machine of the type in which a prime mover is arranged to drive a specified machine part via a rotatably driven shaft, said energy recovery system comprising:
   elastomeric energy storage means in the form of a tube of elastomeric material having first and second ends;
   an elongated shaft having first and second ends;
   means for supporting said elastomeric tube concentrically about and rotationally movable with respect to said elongated shaft;
   a first end member fixedly secured to said shaft at said first end;
   means for fixedly securing said first end of said elastomeric tube to said first end member;
   a second end member disposed coaxially about said second end of said shaft for rotational movement with respect to said shaft;
   means fixedly securing said second end of said elastomeric tube to said second end member;
   a first frame member fixedly positioned proximate said first end member;
   additional means for preventing relative movement between said first end member and said first frame member;
   a second frame member fixedly positioned proximate said second end member;
   selectively actuable brake means for alternatively preventing and permitting relative movement between said second end member and said said second frame member; and
   further means coupling said driven shaft to said elongated shaft at said second shaft end.

2. The energy recovery system according to claim 1 further comprising: a variable transmission connected in driven relation with said driven shaft; and a drive shaft connected in rotatably driven relation with said continuously variable transmission; and wherein said further means includes:
   a further rotatable shaft;
   gearing means coupling both said elongated shaft and said second end member to said further rotatable shaft; and
   clutch means for selectively coupling said further rotatable shaft and said variable transmission;
   wherein said prescribed path includes said gearing means and said further shaft.

3. The energy recovery system according to claim 1 wherein said additional means comprises further selectively actuable braking means for alternatively preventing and permitting relative movement between said first end member and said first frame member.

4. The energy recovery system according to claims 2 or 3 wherein said gearing means comprises a sun gear fixedly secured to said second end of said shaft, plural planet gears secured to said further shaft and in geared engagement with said sun gear; and an annular gear secured to said second end member and in geared engagement with said planet gears.

5. The energy recovery system according to claim 3 further comprising control means for selectively activating said first and further braking means.

6. The energy recovery system according to claim 5 wherein said control means is operative in response to a predetermined operating parameter of said machine.

7. The energy recovery system according to claim 1 further comprising means for simultaneously delivering energy to said machine part from said prime mover and said energy storage device.

8. The energy recovery system according to claim 1 or 7 further comprising means for simultaneously delivering energy from said prime mover to said machine part and to said energy storage device.

9. An energy recovery system for use in a machine of the type in which a prime mover is arranged to drive a specified machine part via driven means, said energy recovery system comprising:
   energy storage means;

selectively acutable first means operative when actuated to transmit kinetic energy along a prescribed path from said driven means to said energy storage means for storage as potential energy in said energy storage means; and selectively actuable second means operative when actuated to release said stored potential energy and transmit it along said prescribed path from said energy storage means to said driven means as kinetic energy to drive said driven means;

wherein said energy storage means in an elastomeric member;

wherein said elastomeric member is a tube of elastomeric material having first and second ends, wherein said first means comprises means for torsionally stressing said tube to store said potential energy therein, and wherein said second means includes means for releasing torsional stress in said tube as said released potential energy; and wherein said energy storage means further comprises:
an elongaged shaft having first and second ends;
means for supporting said elastomeric tube concentrically about and rotationally movable with respect to said shaft;
a first end member fixedly secured to said shaft at said first end;
means for fixedly securing said first end of said elastomeric tube to said first end member;
a second end member disposed coaxially about said second end of said shaft for rotational movement with respect to said shaft;
means fixedly securing said second end of said elastomeric tube to said second end member;
a first frame member fixedly positioned proximate said first end member;
first selectively actuable brake means for alternatively preventing and permitting relative movement between said first end member and said first frame member;
a second frame member fixedly positioned proximate said second end member;
second selectively actuable brake means for alternatively preventing and permitting relative movement between said second end member and second frame member; and
further means coupling said driven means to said shaft at said second shaft end.

10. The energy recovery system according to claim 9 wherein said driven means comprises: a variable transmission connected in driven relation with said prime mover; and a drive shaft connected in rotatably driven relation with said continuously variable transmission; and wherein said further means includes:
a further rotatable shaft;
gearing means coupling both said elongated shaft and said second end member to said further rotatable shaft; and
clutch means for selectively coupling said further rotatable shaft and said variable transmission;
wherein said prescribed path includes said gearing means and said further shaft.

11. An energy recovery system for use in a machine of the type in which a prime mover is arranged to drive a specified machine part via driven means, said energy recovery system comprising:
energy storage means;
selectively actuable first means operative when actuated to transmit kinetic energy along a prescribed path from said driven means to said energy storage means for storage as potential energy in said energy storage means;
selectively actuable second means operative when actuated to release said stored potential energy and transmit it along said prescribed path from said energy storage means to said driven means as kinetic energy to drive said driven means;

wherein said energy storage means is an elastomeric member;

wherein said elastomeric member is a tube of elastomeric material having first and second ends, wherein said first means comprises means for torsionally stressing said tube to store said potential energy therein, and wherein said second means includes means for releasing torisional stress in said tube as said released potential energy;

wherein said energy storage means further comprises:
an elongated shaft having first and second ends;
means for supporting said elastomeric tube concentrically about and rotationally movable with respect to said shaft;
a first end member fixedly secured to said shaft at said first end;
means for fixedly securing one end of said elastomeric tube to said first end member;
a second end member disposed coaxially about said second end of said shaft for rotational movement with respect to said shaft;
means fixedly securing another end of said elastomeric tube to said second end member;
a first frame member fixedly positioned proximate said first end member;
means for preventing movement between said first end member and said first frame member;
a second frame member fixedly positioned proximate said second end member;
selectively actuable brake means for alternatively preventing and permitting relative movement between said second end member and said second frame member; and
further means coupling said driven means to said shaft at said second shaft end.

12. The energy recovery system according to claim 11 wherein said driven means comprises: a variable transmission connected in driven relation with said prime mover; and a drive shaft connected in rotatably driven relation with said continuously variable transmission; and wherein said further means includes:
a further rotatable shaft;
gearing means coupling both said elongated shaft and said further rotatable shaft; and
clutch means for selectively coupling said second end member to said further rotatable shaft and said variable transmission;
wherein said prescribed path includes said gearing means and said further shaft.

13. The energy recovery system according to claims 10 or 12 wherein said gearing means comprises a sun gear fixedly secured to said second end of said shaft, plural planet gears secured to said further shaft and in geared engagement with said sun gear; and an annular gear secured to said second end member and in geared engagement with said planet gears.

14. The energy recovery system according to claim 13 wherein said driven means further comprises an additional drive shaft connected in rotatably driven relation to said prime mover and in rotatable driving relation to said variable transmission and to said clutch means, and wherein said variable transmission includes a first pair of sheave members secured coaxially about said additional drive shaft in axially spaced positions, the axial space between said sheave members being adjustable, the sheave members having mutually presented concave surfaces which are generally frustoconical, and a second pair of similar sheave members secured coaxially about said first-mentioned drive shaft in axially spaced positions, the axial space between said second pair of sheave members being adjustable, and an endless belt extending from between said first pair of sheave members to between said second pair of sheave members and contoured to be engaged between different portions of presented sheave surfaces at each sheave member pair in accordance with the spacing between the sheave members in said pair.

15. The energy recovery system according to claims 10 or 12 wherein said driven means further comprises an additional drive shaft connected in rotatably driven relation to said prime mover and in rotatable driving relation to said variable transmission and to said clutch means, and wherein said variable transmission includes a first pair of sheave members secured coaxially about said additional drive shaft in axially spaced positions, the axial space between said sheave members being adjustable, the sheave members having mutually presented concave surfaces which are generally frusto-conical, and a second pair of similar sheave members secured coaxially about said first-mentioned drive shaft in axially spaced positions, the axial space between said second pair of sheave members being adjustable, and an endless belt extending from between said first pair of sheave members to between said second pair of sheave members and contoured to be engaged between different portions of presented sheave surfaces at each sheave member pair in accordance with the spacing between the sheave members in that pair.

* * * * *